Patented Apr. 15, 1941

2,238,195

UNITED STATES PATENT OFFICE 2,238,195

NITRATION OF ORGANIC COMPOUNDS

Kenneth M. Thompson, Aldan, Pa., assignor to The Atlantic Refining Company, Philadelphia, Pa., a corporation of Pennsylvania No Drawing. Application July 21, 1938, Serial No. 220,514

9 Claims. (Cl. 260—504)

The present invention relates to the nitration of organic compounds diluted with an organic solvent which is inert or substantially less susceptible of nitration than the organic compound to be nitrated, said solvent being substantially immiscible with water and with the nitrating agent, and having substantial solvent power for the nitrated organic compound.

In accordance with this invention, various organic compounds or mixtures thereof, for example, acid sludge, sulfonic acids, phenols, amines, and high boiling or solid hydrocarbons may be diluted with a suitable quantity of a nitrated organic solvent which is substantially unaffected by nitrating agents under the conditions employed for nitrating the organic compound; which is liquid at the temperature of nitration; and which is removable from the nitrated organic compound. Among the nitrated solvents which may be employed are the mono-nitro aliphatic hydrocarbons such as nitromethane, nitroethane, nitropropane, nitrobutane, nitropentane, nitrohexane, nitroheptane and nitrooctane, as well as the mono-nitro monocyclic aromatic hydrocarbons such as nitrobenzene and ortho nitrotoluene. The organic compound, in admixture with or in solution in the nitrated organic solvent, may then be subjected to nitration by contacting with a nitrating agent such as nitric acid or mixtures of nitric and sulfuric acids. After nitration has been effected, the nitrated organic compound in solution in the solvent may be separated from the spent nitrating agent by decantation and/or centrifuging, and the solvent may thereafter be separated from the nitrated organic compound.

The present invention is especially adapted to the treatment of petroleum sulfonic acids for the production therefrom of nitrosulfonic acids and their salts. More particularly, acid sludge containing water-soluble sulfonic acids resulting from the sulfuric acid treatment of relatively low boiling petroleum oils such as gasoline, naphtha, kerosene or gas oil may be employed as a source of sulfonic acids to be nitrated. Such sulfonic acids, in general, have molecular weights of from about 200 to about 300, and corresponding acid values of from about 400 mg. KOH/gm. to about 200 mg. KOH/gm. The acid sludge may be diluted with from about 100% to 500% by weight of a nitrated organic solvent, for example, nitrobenzene, and the mixture then treated with a suitable nitrating agent. However, depending upon the nature of the sludge or its consistency, more or less of the nitrated organic solvent may be employed. The mixture, after nitration, may be further diluted, if desired, with additional nitrated solvent and separated by settling and decantation or centrifuging into one phase or layer consisting essentially of nitrated, water-soluble sulfonic acids in solution in the nitrated organic solvent, and a second phase or layer, immiscible with the first mentioned layer, and comprising the spent nitrating agent and sulfuric acid. In order to recover the nitrated sulfonic acids from solution in the nitrated organic solvent, the latter may be distilled from the nitrated sulfonic acids under reduced pressure. Or, the nitrated sulfonic acids may be neutralized in solution in the nitrated organic solvent by means of an inorganic base, such as sodium or potassium hydroxide or carbonate, preferably applied in the form of an aqueous solution. The nitrosulfonic acid salts, being relatively insoluble in the nitrated organic solvent but soluble in the aqueous alkali solution, may be separated from the solvent and then freed of water by evaporation. Or, alternatively, the nitrated sulfonic acids may be washed from the nitrated organic solvent by means of water, and the aqueous solution thereafter neutralized with alkali, and the water removed from the resulting salts by vaporization, if desired.

My invention may be further illustrated by the following examples, which, however, are not to be construed as limiting the scope thereof.

(1) A gas oil having an A. P. I. gravity of 24° and a distillation range of from 300° F. to 634° F. was agitated with 45% by weight of 98% sulfuric acid for a period of about 20 minutes at a temperature of about 140° F. The mixture was then permitted to settle and the acid sludge comprising diluted sulfuric acid, water-soluble sulfonic acids, and a small amount of tar was separated from the unreacted, sour oil.

213 parts by weight of the acid sludge was admixed with 480 parts by weight of nitrobenzene and the mixture was treated with 37 parts by weight of 74% nitric acid at a temperature of 120° F. The treated mixture was further diluted with 720 parts by weight of nitrobenzene and then permitted to settle and stratify into two layers, one comprising dilute sulfuric acid and a small amount of nitric acid, and the other comprising nitrobenzene containing water-soluble nitrosulfonic acids and a small quantity of tar. The nitrobenzene solution was decanted from the spent nitrating agent and thereafter washed with water to effect extraction of the nitrosulfonic acids from the nitrobenzene. The aqueous solution of nitrosulfonic acids was thereafter neutralized with sodium hydroxide and the water was removed from the resulting sodium nitrosulfonates by vaporization. By this procedure there was obtained a yield of 21% by weight of water-soluble sodium nitrosulfonates, based upon the amount of sludge used. The nitrobenzene was recovered without substantial loss.

By way of comparison, the same treatment was carried out with the exception that the sludge was not diluted with nitrobenzene prior to the nitrating step, the sludge mixture, after nitration, being extracted with 1200 parts by weight of nitrobenzene, the latter then being water washed to effect extraction of the nitrosulfonic acids. Neutralization of the aqueous extract and removal of water from the resulting nitrosulfonates produced a yield of only 16% by weight of sodium nitrosulfonates, based upon the amount of sludge used.

(2) 209 parts by weight of the same acid sludge as employed in Example 1 was admixed with 480 parts by weight of nitrobenzene and 108 parts by weight of 100% sulfuric acid. This mixture was then treated with 36.5 parts by weight of 74% nitric acid at a temperature of 75° F. The treated mixture was further diluted with 660 parts by weight of nitrobenzene and then permitted to settle and stratify into two layers, one comprising dilute sulfuric acid and a small quantity of nitric acid, and the other comprising nitrobenzene containing water-soluble nitrosulfonic acids and a small amount of tar. The nitrobenzene solution was decanted from the spent nitrating agent and thereafter washed with water to effect extraction of the nitrosulfonic acids from the nitrobenzene. The aqueous solution of nitrosulfonic acids was thereafter neutralized with sodium hydroxide and the water was removed from the resulting sodium nitrosulfonates by vaporization. By this procedure there was obtained a yield of 31.5% by weight of water-soluble sodium nitrosulfonates, based upon the amount of sludge used.

While, in the above examples, the organic solvent employed was nitrobenzene, it is to be understood that the other suitable nitrated organic solvents may be utilized, provided they are substantially unaffected by the nitrating agent and are separable from the nitrated product.

What I claim is:

1. In a process of nitrating water-soluble sulfonic acids contained in acid sludge resulting from the sulfuric acid treatment of relatively low boiling petroleum hydrocarbons, the step which comprises diluting said acid sludge with a water-immiscible nitrated organic solvent prior to effecting nitration of said sulfonic acids contained in said sludge, said solvent being substantially less susceptible of nitration than said sulfonic acids, being liquid under the nitrating conditions, having substantial solvent power for the nitrated sulfonic acids, and being separable from the nitrated sulfonic acids.

2. In a process of nitrating water-soluble sulfonic acids contained in acid sludge resulting from the sulfuric acid treatment of relatively low boiling petroleum hydrocarbons, the step which comprises diluting said acid sludge with nitrobenzene prior to effecting nitration of said sulfonic acids contained in said sludge, said nitrobenzene being substantially less susceptible of nitration than said sulfonic acids, being liquid under the nitrating conditions, having substantial solvent power for the nitrated sulfonic acids and being separable from the nitrated sulfonic acids.

3. A process for producing water-soluble nitrosulfonic acids from acid sludge containing water-soluble sulfonic acids resulting from the sulfuric acid treatment of relatively low boiling petroleum hydrocarbons, which comprises diluting said sludge with a water-immiscible nitrated organic solvent, said solvent being substantially less susceptible of nitration than said sulfonic acids, being liquid under the nitrating conditions, having substantial solvent power for nitrated sulfonic acids, and being separable from the nitrated sulfonic acids, contacting said diluted sludge with a nitrating agent to nitrate the sulfonic acids contained in said diluted sludge, separating the solvent containing the nitrosulfonic acids from the spent nitrating agent which is immiscible therewith, and removing solvent from said nitrosulfonic acids.

4. A process for producing water-soluble nitrosulfonic acids from acid sludge containing water-soluble sulfonic acids resulting from the sulfuric acid treatment of relatively low boiling petroleum hydrocarbons, which comprises diluting said sludge with a water-immiscible nitrated organic solvent, said solvent being substantially less susceptible of nitration than said sulfonic acids, being liquid under the nitrating conditions, having substantial solvent power for nitrated sulfonic acids, and being separable from the nitrated sulfonic acids, contacting said diluted sludge with a nitrating agent to nitrate the sulfonic acids contained in said diluted sludge, separating the solvent containing the nitrosulfonic acids from the spent nitrating agent which is immiscible therewith, and washing said nitrosulfonic acids from said solvent with water.

5. A process for producing water-soluble nitrosulfonic acids from acid sludge containing water-soluble sulfonic acids resulting from the sulfuric acid treatment of relatively low boiling petroleum hydrocarbons, which comprises diluting said sludge with a water-immiscible nitrated organic solvent, said solvent being substantially less susceptible of nitration than said sulfonic acids, being liquid under the nitrating conditions, having substantial solvent power for nitrated sulfonic acids, and being separable from the nitrated sulfonic acids, contacting said diluted sludge with a nitrating agent to nitrate the sulfonic acids contained in said diluted sludge, separating the solvent containing the nitrosulfonic acids from the spent nitrating agent which is immiscible therewith, washing said nitrosulfonic acids from said solvent with water, and neutralizing the resulting aqueous solution of nitrosulfonic acids with an inorganic base.

6. A process for producing water-soluble nitrosulfonic acids from acid sludge containing water-soluble sulfonic acids resulting from the sulfuric acid treatment of relatively low boiling petroleum hydrocarbons, which comprises diluting said sludge with nitrobenzene, said nitrobenzene being substantially less susceptible of nitration than said sulfonic acids, being liquid under the nitrating conditions, having substantial solvent power for the nitrated sulfonic acids, and being separable from the nitrated sulfonic acids, contacting said diluted sludge with a nitrating agent to nitrate the sulfonic acids contained in the diluted sludge, separating the nitrobenzene containing the nitrated sulfonic acids from the spent nitrating agent which is immiscible therewith, and washing said nitrated sulfonic acids from said nitrobenzene with water.

7. A process for producing water-soluble nitrosulfonic acids from acid sludge containing water-soluble sulfonic acids resulting from the sulfuric acid treatment of relatively low boiling petroleum hydrocarbons, which comprises diluting said sludge with a water-immiscible nitrated organic solvent, said solvent being substantially less susceptible of nitration than said sulfonic acids, being liquid under the nitrating conditions, having substantial solvent power for nitrated sulfonic acids, and being separable from the nitrated sulfonic acids, contacting said diluted sludge with a nitrating agent to nitrate the sulfonic acids contained in said diluted sludge, separating the solvent containing the nitrosulfonic acids from the spent nitrating agent which is immiscible therewith, and neutralizing the nitrosulfonic acids contained in said solvent with an inorganic base.

8. A process according to claim 7, wherein the organic solvent is separated from the neutralized nitrosulfonic acids.

9. A process for producing water-soluble nitrosulfonic acids from acid sludge containing water-soluble sulfonic acids resulting from the sulfuric acid treatment of relatively low boiling petroleum hydrocarbons, which comprises diluting said sludge with a water-immiscible nitrated organic solvent, said solvent being substantially less susceptible of nitration than said sulfonic acids, being liquid under the nitrating conditions, having substantial solvent power for nitrated sulfonic acids, and being separable from the nitrated sulfonic acids, contacting said diluted sludge with a nitrating agent to nitrate the sulfonic acids contained in said diluted sludge, further diluting the nitrated sludge-solvent mixture with an additional quantity of nitrated organic solvent, separating the solvent containing the nitrosulfonic acids from the spent nitrating agent which is immiscible therewith, and neutralizing the nitrosulfonic acids contained in said solvent with an inorganic base.

KENNETH M. THOMPSON.